United States Patent [19]

Chancler

[11] 4,265,965

[45] May 5, 1981

[54] POLYURETHANE FOAM ARTICLES COATED WITH A CRUSHED FOAM AND METHOD OF PRODUCING

[75] Inventor: Francis X. Chancler, Southampton, Pa.

[73] Assignee: Rohm and Haas Company, Philadelphia, Pa.

[21] Appl. No.: 703,347

[22] Filed: Jul. 7, 1976

Related U.S. Application Data

[63] Continuation of Ser. No. 522,079, Nov. 8, 1979, abandoned, which is a continuation-in-part of Ser. No. 415,027, Nov. 12, 1973, abandoned.

[51] Int. Cl.³ .................... B32B 5/18; B32B 27/00
[52] U.S. Cl. .................................. 428/315; 181/294; 264/45.1; 264/48; 264/321; 427/244; 427/276; 427/278; 427/358; 427/365; 427/369; 427/373; 427/379
[58] Field of Search .............. 427/373, 369, 370, 358, 427/366, 365, 278, 276, 380, 379; 428/315, 160; 264/48, 45.1, 321; 181/294

[56] References Cited

U.S. PATENT DOCUMENTS

| | | | |
|---|---|---|---|
| 2,994,110 | 8/1961 | Hardy | 264/112 |
| 3,228,820 | 1/1966 | Samson | 264/323 |
| 3,443,007 | 5/1969 | Hardy | 264/321 |
| 3,607,341 | 9/1971 | Goins | 264/321 |
| 3,607,593 | 9/1971 | Semenzato | 156/78 |
| 3,709,966 | 1/1973 | Gambardella | 264/321 |
| 3,887,409 | 6/1975 | McCreary et al. | 264/321 |
| 4,049,848 | 9/1977 | Goodale et al. | 427/244 |

*Primary Examiner*—Michael R. Lusignan
*Assistant Examiner*—S. L. Childs
*Attorney, Agent, or Firm*—Patrick C. Baker

[57] ABSTRACT

Crushed foam coated urethane foam is disclosed wherein the crushed foam coating contains a pigment or a flame retardant or both to protect the urethane foam against discoloration due to ultraviolet light or to provide protection against fires. The crushed foam may be obtained from a frothed latex applied to the polyurethane foam, dried and crushed to a final thickness of 10 mils to 250 mils.

24 Claims, No Drawings

POLYURETHANE FOAM ARTICLES COATED WITH A CRUSHED FOAM AND METHOD OF PRODUCING

This application is a continuation of application Ser. No. 522,079, Nov. 8, 1979, is a continuation-in-part of application Ser. No. 415,027, filed Nov. 12, 1973. Both prior applications are now abandoned.

This invention relates to a novel article of manufacture which comprises a polyurethane foam which is coated with a crushed foam coating containing pigments or flame retardants or both with a polymer emulsion or latex as the binder on the coating.

Polyurethane foam coated by conventional paints generally afford products which are stiff and impermeable to air. Additionally, where the polyurethane foam surface is rough or highly textured, it is quite difficult to achieve uniform coverage and coating thickness. This invention provides crushed foam coated polyurethane foams which are soft, flexible and air-permeable.

The products of this invention may be transported and handled as roll goods and installed at point of use by adhesively bonding to a suitable support, for example, plywood, hardboard, particle board, plastic board, metal or other commonly used surfacing or subsurfacing materials employed in construction of dwellings, office buildings, automobile interiors, trunk linings and the like. In addition, the crushed foam coated polyurethane foams can be formed into tiles or panels and applied to either existing wall surfaces or can be employed in new construction. The crushed foam coating is porous thereby affording a product which has good acoustical properties. This product is especially useful in ceilings and side panels for mobile homes or prefabricated dwellings which are subject to constant vibration during the transportation of these homes. In addition, the incorporation of a flame retardant additive into the crushed foam coating affords materials which are not only aesthetically pleasing but also provide a margin of safety not previously obtainable.

To afford a crushed foam coating which will provide resistance to ultraviolet radiation, it is necessary to incorporate pigments or fillers or both. For example, clays, especially of the kaolin type, calcium carbonate, blanc fixe, talc, titanium dioxide, colored lakes and toners, chrome yellow, molybdate orange, toluidine red, copper phthalocyanines, such as the "Monastral" blue and green lakes.

To impart flame retardancy, it is necessary to incorporate into the crushed foam coating metal salts such as aluminum hydrate or ammonium polyphosphate, ammonium sulfamate, tris(2,3-dibromopropyl)phosphate or similar flame retardant additives.

The amount of pigment employed to afford resistance to ultraviolet degradation is from 1% to about 200% based on the weight of the aqueous polymer emulsion or latex in the crushed foam composition.

The foam which is to be crushed has initially a wet foam density of from about 0.09 grams/cc. to about 0.5 grams/cc. and is applied on the polyurethane foam at an average thickness of from about 10 mils to 250 mils, preferably, 30 mils to 180 mils. Of course, thicker portions may appear opposite large cavities in the polyurethane foam.

The polyurethane foam may vary from a foam having small uniform cells of about 0.1–1 mm. in diameter to a foam having numerous randomly distributed small and large cells up to about 2 cm. in diameter. Suitable rigid or resilient polyurethane foams may be prepared by known methods such as are disclosed in U.S. Pat. Nos. 2,846,408 issued Aug. 5, 1958, 3,336,248, issued Aug. 15, 1967, 3,342,757, issued Sept. 19, 1967, and 3,085,896, issued Apr. 13, 1963. The polyurethane foam may be any shape, or generally planar shell thereof from about 2 mm. to 10 cm. preferably 1 cm. to 5 cm. in thickness being typical. The polyurethane may be cut from a larger sheet or piece of foam or formed in one piece. The cells or pores may be open to the surface of the polyurethane or have a sealed surface, before coating with the crushable foam.

The temperature for drying the foam and the oven dwell drying time will depend upon the type of polyurethane foam which is to be coated and the thickness of the coating. In general, drying times vary from about 2 minutes up to about 10 minutes at a temperature in the range from about 180° to about 280° F. The foam coating containing the pigment or flame retardant or both must be dry before satisfactory crushing can be accomplished. The crushing, which term is intended to encompass embossing, takes place immediately after drying and before extensive crosslinking takes place in the polymer. Subsequent to crushing the crushed foam is crosslinked or thermoset. Usually the residual heat in the foam from the drying step is adequate to insure crosslinking and retention of the crushed state. The polyurethane foam is not crushed permanently. If resilient, it is such that it rebounds to its original shape. If rigid, it retains its shape. The average thickness of the dried, crushed foam is from about 2 mils to about 10 mils. The crushing (embossing) is done at a pressure in the range of from about 5 to about 2500 psi. and preferably in the range of from about 15 to about 1200 psi.

For a description pf suitable conventional foaming procedures and stabilizers and foaming agents, reference is made to Madge, E. W., "Latex Foam Rubber", John Wiley and Sons, New York (1962) and Rogers, T. H., "Plastic Foams", Paper, Reg. Tech. Conf., Palisades Sect., Soc. Plastics Engrs., New York (November 1964). Most common are the alkali metal, ammonia, and amine soaps of saturated or unsaturated acids having, for example, from about 12 to about 22 carbon atoms. Examples of suitable soaps include tallow soaps and coconut oil soaps, preferably the volatile amine or ammonia soaps, so that the volatile portion is vaporized from the foam. Other useful foaming-foam-stabilizing agents include lauryl sulfate/lauryl alcohol, lauryl sulfate/lauric acid, sodium lauryl sulfate, and other commonly used foam stabilizers or foaming agents.

A water soluble surfactant or a combination of surfactants are usually employed in preparing the copolymers. Surfactants which may be employed either alone or together include the alkali metal salts of aliphatic or alkylaryl sulfonic acids, such as sodium lauryl sulfate, sodium dodecylbenzene sulfonate and the like, as well as nonionic surfactants such as polyethylene oxide condensates of the alkyl phenols or higher fatty alcohols, for example, tert-octylphenol condensed with from 5 to about 40 ethylene oxide units, lauryl alcohol condensed with from 5 to 50 ethylene oxide units or similarly ethylene oxide condensates of long chain mercaptans, fatty acids, amines and the like. Sodium laurylsulfate is the preferred surfactant. Also, foaming aids are required. These foaming aids include the alkali metal, ammonium or amine salts, such as the mono-, di- or triethanol amines of the aliphatic carboxylic acids having from 16 to 20 carbon atoms including oleic acid, stearic acid and the like; for example, sodium, potassium or ammonium stearate; sodium, potassium or ammonium oleate and the like. Ammonium stearate is the preferred foaming aid. The above foam formulation generally contains from about 0.5 to about 3% of surfactant and from about 1 to about 5% of foaming aid.

The latex or polymer emulsion, when formulated with the surfactant(s) and foaming aid(s) and optionally, suitable pigments, is readily convertible into the foamed state. The polymer composition is such that excessive thickening of the formulation is not encountered under the acid or alkaline conditions employed to assure the most efficient operation of the foam stabilizing agent. In addition, the copolymer is such that the crushed foam retains its softness and its flexibility down to about 10° F.

The emulsion polymers of the latex compositions that produce the foams in the present invention are prepared from at least three of the following monomers of which at least one is a monomer which contains functional groups capable of crosslinking:

(a) an $\alpha, \beta$-ethylenically unsaturated acid which includes acrylic acid, methacrylic acid, ethacrylic acid, itaconic acid, aconitic acid, crotonic acid, citraconic acid, maleic acid, fumaric acid, $\alpha$-chloroacrylic acid, cinnamic acid, mesaconic acid, and the like. Mixtures of these acids can also be used;

(b) a monomer of the formula

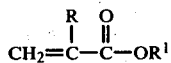

wherein R is hydrogen or alkyl, for example, lower alkyl of from 1–4 carbon atoms and $R^1$ is a straight, branched or cyclic alkyl, alkoxyalkyl or alkylthioalkyl having from 1 to 20 carbon atoms, or cycloalkyl having from 5–6 carbon atoms, such as methyl, ethyl, propyl, n-butyl, 2-ethylhexyl, heptyl, hexyl, octyl, 2-methylbutyl, 1-methylbutyl, butoxybutyl, 2-methylpentyl, ethoxyethyl, cyclopentyl, cyclohexyl, isobutyl, ethylthioethyl, methylthioethyl, ethylthiopropyl, 6-methylnonyl, decyl, dodecyl, tetradecyl, pentadecyl and the like; $R^1$ is also ureido, hydroxy lower alkyl of from 1 to 5 carbon atoms such as hydroxymethyl, hydroxyethyl, hydroxypropyl, hydroxybutyl, hydroxypentyl, and the like; 2,3-epoxypropyl, amino lower alkyl or mono- or di-lower alkyl or hydroxy lower alkyl substituted amino lower alkyl;

(c) a monomer of the formula

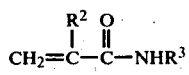

wherein $R^2$ is hydrogen or methyl and $R^3$ is hydrogen or hydroxy lower alkyl such as hydroxymethyl and the like; or (d) a monomer of the formula

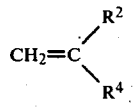

wherein $R^2$ is hydrogen or methyl and $R^4$ is halo such as chloro and the like, lower alkanoyloxy such as acetoxy and the like, cyano, formyl, phenyl, tolyl, methoxyethyl, 2,4-diamino-s-triazinyl lower alkyl or epoxy.

Examples of the specific monomers described in subparagraphs (b), (c), and (d) which may be employed are: methyl methacrylate, ethyl methacrylate, propyl methacrylate, isopropyl methacrylate, n-butyl methacrylate, isobutyl methacrylate, sec-butyl methacrylate, tert-butyl methacrylate, pentyl methacrylate, isopentyl methacrylate, tert-pentyl methacrylate, hexyl methacrylate, cyclohexyl methacrylate, 2-ethylbutyl methacrylate, 2-ethylhexyl methacrylate, octyl methacrylate, decyl methacrylate, lauryl methacrylate, myristyl methacrylate, cetyl methacrylate, stearyl methacrylate, methyl acrylate, ethyl acrylate, propyl acrylate, isopropyl acrylate, butyl acrylate, isobutyl acrylate, sec-butyl acrylate, tert-butyl acrylate, amyl acrylate, isoamyl acrylate, tert-amyl acrylate, hexyl acrylate, octyl acrylate, 2-ethylhexyl acrylate, vinyl acetate, tetradecyl acrylate, acrylamide, pentadecyl acrylate, styrene, pentadecyl methacrylate, vinyl toluene, methacrylamide, N-methylolacrylamide and the like, glycidyl methacrylate, methylaminoethyl methacrylate, tert-butylaminoethyl methacrylate, 6-(3-butenyl)-2,4-diamino-s-triazine, hydroxypropyl methacrylate, hydroxyethyl methacrylate, methacrylonitrile, methoxymethyl methacrylamide, N-methylol methacrylamide, acrolein, methacrolein, 3,4-epoxy-1-butene, the analogs of the above methacrylic acid derivatives with other unsaturated acids such as acrylic acid and itaconic acid, dicarboxylic acids such as maleic acid and half esters and half amides thereof.

The preferred emulsion polymers for preparing the crushed foam coating are those prepared from the following monomers:

(a) 0–3% itaconic acid;
(b) 40–97% ethyl acrylate, vinyl or vinylidene chloride;
(c) 0.15–10% of an acrylic amide selected from acrylamide, methacrylamide, N-methylol acrylamide or N-methylol methacrylamide or combinations thereof;
(d) 0–15% acrylonitrile and
(e) 0–60% butyl acrylate.

Especially preferred for preparing a crushed foam coating are those emulsion polymers containing:

(1) 0.5–1.5% itaconic acid;
(2) 40–70% ethyl acrylate;
(3) 2–6% of an acrylic amide;
(4) 3–7% acrylonitrile and
(5) 20–50% butyl acrylate.

As may be seen, the crosslinkable addition polymerizable unsaturated monomers have reactive polar groups selected from

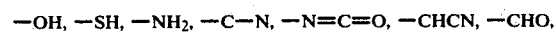
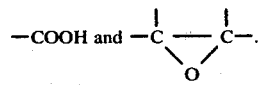

Of course, water-sensitive materials such as isocyanates should not be used in aqueous systems unless they are blocked by reaction with a phenol group which protects the isocyanate groups until subsequent heating or the use of other reaction mechanisms such as the use of calcium, zinc, or tin compound catalyst conventional in the art.

The preferred emulsion copolymers have a molecular weight of between about 70,000 and 2,000,000 and preferably between about 250,000 and 1,000,000 and are made by the emulsion copolymerization of the several monomers in the proper proportions. Emulsion polymerization techniques are described in U.S. Pat. Nos. 2,754,280 and 2,795,654. Thus, the monomers may be emulsified with an anionic, a cationic, or a nonionic dispersing agent, about 0.05 to 10% thereof ordinarily being used on the weight of the total monomers. The acid monomer and many of the other functional or polar monomers may be soluble in water so that the dispersing agent serves to emulsify the other monomer or monomers. A polymerization initiator of the free-radical type, such as ammonium or potassium persulfate, may be used alone or in conjunction with an accelerator, such as potassium metabisulfite, or sodium thiosulfate. Organic peroxides, such as benzoyl peroxide and tert-butyl hydroperoxide are also useful initiators. The initiator and accelerator, commonly referred to as catalyst, may be used in proportions of 0.1% to 10% each based on the weight of monomers to be copolymerized. The amount, as indicated above, may be adjusted to control the intrinsic viscosity of the polymer. The temperature of the reaction may be in the range of from about room temperature up to about 140° F.

While many of the monomers disclosed are capable of crosslinking with one another, the preferred monomers employed require small amounts of a crosslinking agent such as aminoaldehyde resins including melamine, melamine formaldehyde condensates, formaldehyde condensates, butylated melamine formaldehyde condensates and the like. "Aerotex M-3" is an example of an aqueous melamine formaldehyde resin.

The following examples illustrate the manner in which all of the products of this invention may be prepared:

EXAMPLE 1

An aqueous acrylic emulsion polymer having the composition 65EA/25.5BA/4.5AN/3.5AM/1.5IA is compounded at room temperature using the following formulation:

| | |
|---|---|
| Polymer (50% solids) | 100 |
| Titanium Dioxide (50%) | 25 |
| Aluminum Hydrate | 50 |
| Melamine/Formaldehyde | 2.3 |
| 33% Ammonium Stearate | 7.0 |
| 28% Ammonium Hydroxide | 2.0 |
| Water | 57 |
| Hydroxyethyl Cellulose | 0.3 |
| TOTAL: | 243.6 |

The percentages refer to concentrations in water. This formulation is passed through a continuous mechanical foam device such as the Oakes Foamer mixed with air to obtain a coating consistency having a wet density of 0.1–0.3 grams/cc. This foamed material is applied to an uneven polyurethane foam by knife over roll applying a wet foam thickness of 0.030" to 0.180". This material is placed in an oven at 280° F. and dried for from 2 to about 10 minutes. After drying, the substrate with the foam coating is crushed between rolls at a pressure in the range of from about 100 to about 500 pounds per lineal inch. This results in a coating weight of approximately 10 ounces of dry coating per square yard.

EXAMPLE 2

Example 1 is repeated employing as the crushed foam coating an acrylic emulsion polymer having the composition 86EA/10AN/4MOA using the following formulation:

| | |
|---|---|
| Polymer (55% solids) | 100 parts |
| Titanium Dioxide (50%) | 25 |
| Aluminum Hydrate | 55 |
| Melamine Formaldehyde Resin | 2.3 |
| 33% Ammonium Stearate | 7.0 |
| 28% Ammonium Hydroxide | 2.0 |
| Water | 19.9 |
| Hydroxyethyl Cellulose | 0.2 |
| TOTAL: | 211.4 |

EXAMPLE 3

Example 1 is repeated using as a crushed foam coating an emulsion polymer having the composition 29.5BA/68.5VCl/0.5IA/1.5MOA using the following formulation:

| | |
|---|---|
| Polymer (40% solids) | 103 Parts |
| Titanium Dioxide (50%) | 25 |
| Aluminum Hydrate | 15 |
| 2-Ethylhexyldiphenyl Phosphate | 15 |
| Melamine Formaldehyde Resin | 2.3 |
| 33% Ammonium Stearate | 7.0 |
| 28% Ammonium Hydroxide | 2.0 |
| Water | 16.9 |
| Hydroxyethyl Cellulose | 0.5 |
| TOTAL: | 186.7 |

EXAMPLE 4

A vinylidene chloride emulsion polymer having the composition 52.8 $VCL_2$/43.3BA/5.2MOA/0.3MAM/0.4M1MAM using the following formulation

| | |
|---|---|
| Polymer (40% solids) | 108.7 Parts |
| Titanium Dioxide (50%) | 25 |
| Aluminum Hydrate | 15 |
| Melamine Formaldehyde | 2.3 |
| 33% Ammonium Stearate | 7.0 |
| 28% Ammonium Hydroxide | 2.0 |
| Water | 4.7 |
| Hydroxyethyl Cellulose | 0.5 |
| TOTAL: | 165.2 |

EXAMPLE 5

Example 1 is repeated using as the crushed foam coating an acrylic emulsion polymer having the composition 86EA/10AN/4MOA using the following formulation:

| | |
|---|---|
| Polymer (55%) | 100 Parts |
| Aluminum Hydrate | 55 |
| Titanium Dioxide | 12.5 |
| 33% Ammonium Stearate | 7.0 |
| 28% Ammonium Hydroxide | 2.0 |
| Melamine Formaldehyde Resin | 2.3 |
| Water | 47.0 |
| Sodium Salt of a Copolymer of Maleic Anhydride and diisobutylene (25%) | 1.6 |
| Emulsion Copolymer of 60EA/40MAA (28%) | 2.9 |

| | |
|---|---|
| Water | 2.9 |
| TOTAL: | 233.2 |

The sodium salt of the copolymer of maleic anhydride and diisobutylene is added to the water and is well dissolved. Titanium dioxide is then slowly added to allow wetting out and dispersed with good shear for 10 to 15 minutes. Aluminum hydrate is then slowly added over a period of 10–15 minutes. The emulsion polymer is then added to the pigment slowly with stirring and then followed by addition of the melamine formaldehyde resin. The reaction mixture is stirred for 1–2 minutes and then a 1:1 mixture of the copolymer of 60EA/40MAA and water is added. This mixture is stirred for an additional 1–2 minutes. Ammonium hydroxide is added which causes some thickening to occur. The ammonium stearate is added last. The pH of the formulation is 9.5 and has an initial Brookfield viscosity Spindle No. 4 at 6 rpm. of 1180 cps.

EXAMPLE 6

Example 4 is repeated using as the crushed foam coating an emulsion polymer having the composition 83.9BA/12.5AN/3.6M1MAM.

EXAMPLE 7

An acrylic emulsion polymer having the composition 83.9BA/12.5AN/3.6M1MAM is compounded using the following formulation:

| | |
|---|---|
| Polymer (46%) | 108.7 Parts |
| Titanium Dioxide (50%) | 25 |
| Aluminum Hydrate | 55 |
| Melamine Formaldehyde Resin | 2.3 |
| 33% Ammonium Stearate | 7.0 |
| 28% Ammonium Hydroxide | 2.0 |
| Water | 15.9 |
| Emulsion Copolymer of 60EA/ 40MAA (5%) Solids | 2.9 |
| Sodium Salt of the copolymer of maleic anhydride and diisobutylene (25%) | 1.6 |
| Water | 2.9 |
| TOTAL: | 223.3 |

EXAMPLE 8

Example 1 is repeated employing as the crushed foam coating an acrylic emulsion polymer having the composition 65EA/25.5BA/4.5AN/3.5MOA/1.5IA.

EXAMPLE 9

A vinyl chloride emulsion polymer having the composition 29.5BA/68.5VCL1/1.5MOA/0.5IA using the following formulation:

| | |
|---|---|
| Polymer (50%) | 100 Parts |
| Titanium Dioxide (50%) | 25 |
| Aluminum Hydrate | 15 |
| 2-Ethylhexyldiphenyl phosphate | 15 |
| Melamine Formaldehyde Resin | 2.3 |
| 33% Ammonium Stearate | 7.0 |
| 28% Ammonium Hydroxide | 2.0 |
| Water | 9.7 |
| Hydroxyethyl Cellulose | 0.5 |
| TOTAL: | 176.5 |

EXAMPLE 10

Example 1 is repeated employing as the crushed foam coating an acrylic emulsion polymer having the composition 96EA/3.5AM/0.5AA.

The following definitions explain the abbreviations used in the foregoing specification: EA=ethyl acrylate; BA=butyl acrylate; AN=acrylonitrile; MIAM=N-methylolacrylamide; AM=acrylamide; IA=itaconic acid; VCL=vinyl chloride; $VCL_2$=vinylidene chloride; MAM=methacrylamide; M1MAM=1/1 molar ratio of MAM and N-methylolmethacrylamide; AA=acrylic acid and MOA=1/1 molar ratio of AM and MIAM.

What is claimed is:

1. An article of manufacture comprising a polyurethane foam coated with a crushed foam, said crushed foam resulting from application to said polyurethane foam of a foamed polymer emulsion containing a crosslinkable emulsion polymer followed by drying, crushing and curing said foamed polymer emulsion, said crushed foam having incorporated therein one or more of a pigment, a filler, and a flame retardant.

2. The article of claim 1 wherein the pigment or filler is selected from titanium dioxide, calcium carbonate kaolin, colored lakes and toners, ochre, carbon black, graphite, aluminum powder or flakes, chrome yellow, molybdate orange, toluidine red or copper phthalocyanines.

3. The article of claim 1 wherein the flame retardant is selected from aluminum trihydrate, zinc borate, ammonium polyphoshate, ammonium sulfamate or tris-2,3-dibromophosphate.

4. The article of claim 1 wherein the polymer emulsion is prepared from an acrylic emulsion polymer.

5. The article of claim 1 wherein the polymer emulsion is prepared from a vinyl chloride emulsion polymer.

6. The article of claim 1 wherein the polymer emulsion is prepared from a vinylidene chloride emulsion polymer.

7. The article of claim 1 wherein the foam coating is from 30 to 180 mils. in thickness prior to crushing.

8. The article of claim 1 wherein the emulsion polymer is prepared from at least three of the following monomers:

(a) an α, β-ethylenically unsaturated acid;
(b) a monomer of the formula

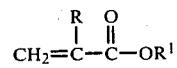

wherein R is hydrogen of alkyl and $R^1$ is straight, branched or cyclic alkyl, alkoxyalkyl or alkylthioalkyl;

(c) a monomer of the formula

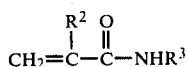

wherein $R^2$ is hydrogen or methyl and $R^3$ is hydrogen or hydroxy lower alkyl and
(d) a monomer of the formula

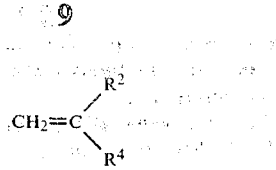

wherein $R^2$ is hydrogen or methyl and $R^4$ is halo, lower alkanoyloxy, cyano, formyl, phenyl, tolyl, methoxyethyl, 2,4-diamino-s-triazinyl lower alkyl or epoxy.

9. The article of claim 1 wherein the emulsion polymer of the crushed foam has the following composition:
(a) 0–3% itaconic acid;
(b) 40–97% ethyl acrylate, vinyl or vinylidene chloride;
(c) 0.5–10% of an acrylic amide;
(d) 0–15% acrylonitrile and
(e) 0–60% of butyl acrylate.

10. The article of claim 1 wherein the emulsion polymer of the crushed foam has the following composition:
(a) 0.3–1.5% itaconic acid;
(b) 40–70% ethyl acrylate;
(c) 2–6% of an acrylic amide;
(d) 3–7% acrylonitrile;
(e) 20–50% butyl acrylate.

11. The article of claim 1 wherein the emulsion polymer of the crushed foam contains the following proportion of monomers:
(a) 1.5% itaconic acid;
(b) 65% ethyl acrylate;
(c) 3.5% acrylamide;
(d) 4.5% acrylonitrile and
(e) 25.5% butyl acrylate.

12. The article of claim 9 wherein the emulsion polymer of the crushed foam has the following composition:
(a) 52.8% vinylidene chloride;
(b) 43.3% butyl acrylate;
(c) 3.2% of a 1/1 molar ratio of acrylamide and N-methylolacrylamide;
(d) 0.4% methacrylamide and
(e) 0.3% N-methylolacrylamide.

13. The article of claim 9 wherein the emulsion polymer of the crushed foam has the following composition:
(a) 68.5% vinyl chloride;
(b) 29.5% butyl acrylate;
(c) 1.5% of a 1/1 molar ratio of acrylamide and N-methylolacrylamide and
(d) 0.5% itaconic acid.

14. A process for preparing an article of manufacture which comprises coating a polyurethane foam with a foamed polymer emulsion containing an emulsion polymer and one or more of a pigment, a filler and a flame retardant, drying the polymer emulsion foam at a temperature in the range of from about 180° to about 280° F. for a period of time ranging from 2 up to about 10 minutes followed by crushing, embossing, and curing the coated substrate at a pressure in the range of from about 5 to about 2500 p.s.i.

15. The process according to claim 14 wherein the emulsion polymer is prepared from at least three of the following monomers:
(a) an α, β-ethylenically unsaturated acid;
(b) a monomer of the formula

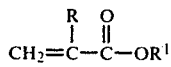

wherein R is hydrogen or alkyl and $R^1$ is straight, branched or cyclic alkyl, alkoxyalkyl or alkylthioalkyl;
(c) a monomer of the formula

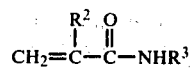

wherein $R^2$ is hydrogen or methyl and $R^3$ is hydrogen or hydroxy lower alkyl and
(d) a monomer of the formula

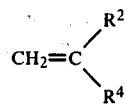

wherein $R^2$ is hydrogen or methyl and $R^4$ is halo, lower alkanoyloxy, cyano, formyl, phenyl, tolyl, methoxyethyl, 2,4-diamino-s-triazinyl lower alkyl or epoxy.

16. The process of claim 15 wherein the emulsion polymer has the following composition:
(a) 0–3% itaconic acid;
(b) 40–97% ethyl acrylate, vinyl or vinylidene chloride;
(c) 0.5–10% of an acrylic amide;
(d) 0–15% acrylonitrile and
(e) 0–60% of butyl acrylate.

17. The process of claim 15 wherein the emulsion polymer has the following composition:
(a) 0.3–1.5% itaconic acid;
(b) 40–70% ethyl acrylate;
(c) 2–6% of an acrylic amide;
(d) 3–7% acrylonitrile;
(e) 20–50% butyl acrylate.

18. The process of claim 15 wherein the emulsion polymer has the following composition:
(a) 1.5% itaconic acid;
(b) 65% ethyl acrylate;
(c) 3.5% acrylamide;
(d) 4.5% acrylonitrile and
(e) 25.5% butyl acrylate.

19. The process of claim 15 wherein the emulsion foam has the following composition:
(a) 52.8% vinylidene chloride;
(b) 43.3% butyl acrylate;
(c) 3.2% of a 1/1 molar ratio of acrylamide and N-methylolacrylamide;
(d) 0.4% methacrylamide and
(e) 0.3% N-methylolacrylamide.

20. The process of claim 15 wherein the emulsion foam has the following composition:
(a) 68.5% vinyl chloride;
(b) 29.5% butyl acrylate;
(c) 1.5% of a 1/1 molar ratio of acrylamide and N-methylolacrylamide and
(d) 0.5% itaconic acid.

21. An acoustical panel formed from the article of claim 1.

22. A method for producing a composite building material having a continuously textured surface, comprising:
a. providing (i) a foamed emulsion of an uncured and uncrosslinked elastomeric resin composition and (ii) a self-supporting resilient urethane foam substrate;

b. disposing said foamed elastomeric resin composition onto a surface of said urethane substrate to form a substantially uniform coating of predetermined thickness on the substrate, said thickness being such as to permit the irregular cell structure of the underlying urethane substrate to affect the exposed surface of the elastomeric layer in the subsequent step (d) so that after the composite structure is fully processed said textured surface is formed therein;

c. drying said elastomeric resin foam coating until said elastomeric resin foam forms a layer which is only partially cured and partially crosslinked;

d. crushing said composite structure so that said partially cured elastomeric layer is densified, the resultant partial compression of the elastomeric foam creating a continuous texture on the exposed surface thereof; and e. further curing said textured elastomeric layer to hold said textured surface and forming said composite building material.

23. A product produced according to the method of claim 22.

24. A composite building material having a continuously textured surface comprising:
  (a) a resilient urethane foam substrate; and
  (b) a cured elastomeric layer adjacent to and embedded in the cells of one surface of said substrate, said elastomeric layer having an exposed surface with a texture which approximates the cellular structure of the adjacent substrate surface.

* * * * *

UNITED STATES PATENT AND TRADEMARK OFFICE
CERTIFICATE OF CORRECTION

PATENT NO. : 4,265,965
DATED : May 5, 1981
INVENTOR(S) : Francis X. Chancler

It is certified that error appears in the above—identified patent and that said Letters Patent is hereby corrected as shown below:

Column 4, line 56, change "C-N," to -- $C \equiv N$, --.

Signed and Sealed this

Ninth Day of February 1982

[SEAL]

Attest:

GERALD J. MOSSINGHOFF

*Attesting Officer*     *Commissioner of Patents and Trademarks*